US012403729B2

(12) United States Patent
Bejinaru (10) Patent No.: US 12,403,729 B2
(45) Date of Patent: Sep. 2, 2025

(54) ANTENNA STRUCTURE AND WHEEL STRUCTURE WITH A TPMS SYSTEM

(71) Applicant: Continental Automotive Technologies GmbH, Hannover (DE)

(72) Inventor: Razvan Bejinaru, Timisoara (RO)

(73) Assignee: Continental Automotive Technologies GmbH, Hannover (DE)

( * ) Notice: Subject to any disclaimer, the term of this patent is extended or adjusted under 35 U.S.C. 154(b) by 93 days.

(21) Appl. No.: 18/554,462

(22) PCT Filed: Apr. 4, 2022

(86) PCT No.: PCT/EP2022/058906
§ 371 (c)(1),
(2) Date: Oct. 6, 2023

(87) PCT Pub. No.: WO2022/214440
PCT Pub. Date: Oct. 13, 2022

(65) Prior Publication Data
US 2024/0198738 A1     Jun. 20, 2024

(30) Foreign Application Priority Data

Apr. 7, 2021  (EP) ................................ 21465516

(51) Int. Cl.
*B60C 23/04*   (2006.01)
*H01Q 1/22*   (2006.01)

(52) U.S. Cl.
CPC ....... *B60C 23/0452* (2013.01); *H01Q 1/2241* (2013.01)

(58) Field of Classification Search
CPC ............ B60C 23/0452; B60C 23/0444; H01Q 1/2241; H01Q 1/32; H01Q 9/02; H01Q 1/3291
USPC .......................................... 340/442
See application file for complete search history.

(56) References Cited

U.S. PATENT DOCUMENTS

| | | | |
|---|---|---|---|
| 6,593,900 B1 * | 7/2003 | Craven ................ | H01Q 1/38 343/742 |
| 6,850,197 B2 * | 2/2005 | Paun .................... | H01Q 9/42 343/702 |
| 6,977,615 B2 * | 12/2005 | Brandwein, Jr. ... | B60C 23/0444 343/846 |
| 10,206,231 B1 * | 2/2019 | Kandler ............... | H04L 1/1887 |

(Continued)

FOREIGN PATENT DOCUMENTS

| | | |
|---|---|---|
| EP | 1808315 A1 | 7/2007 |
| JP | 2005349905 A | 12/2005 |

(Continued)

OTHER PUBLICATIONS

Great Britain Intellectual Property Office Action dated Oct. 4, 2021 for the counterpart GB Application No. 2105004.2.

(Continued)

*Primary Examiner* — Eric Blount (57) ABSTRACT

A wheel unit antenna for use in a TPMS and corresponding wheel structure, in which the antenna is sized and oriented such that complete wheel structure including tire will act as a waveguide. The antenna may be non-resonant, in the form of a monopole perpendicular to a ground plane. In addition, the antenna has a length substantially shorter than a quarter wavelength, for example λ/10 or less.

5 Claims, 8 Drawing Sheets

(56) References Cited

U.S. PATENT DOCUMENTS

| | | | |
|---|---|---|---|
| 11,594,820 B2* | 2/2023 | Foo | H01Q 9/0457 |
| 2005/0179529 A1 | 8/2005 | Sato | |
| 2008/0001842 A1* | 1/2008 | Shigihara | H01Q 1/2241 343/872 |
| 2012/0083234 A1 | 4/2012 | Kosugi | |
| 2013/0025751 A1 | 1/2013 | Dassano | |

FOREIGN PATENT DOCUMENTS

| | | |
|---|---|---|
| JP | 2008154193 A | 7/2008 |
| JP | 2012061972 A | 3/2012 |

OTHER PUBLICATIONS

Great Britain Intellectual Property Office Action dated Jun. 28, 2023 for the counterpart GB Application No. 2105004.2.

The International Search Report and the Written Opinion of the International Searching Authority mailed on Jul. 21, 2022 for the PCT Application No. PCT/EP2022/058906 which this application claims priority.

\* cited by examiner

ANTENNA STRUCTURE AND WHEEL STRUCTURE WITH A TPMS SYSTEM

CROSS-REFERENCE TO RELATED APPLICATIONS

The present application is a National Stage Application under 35 U.S.C. § 371 of International Patent Application No PCT/EP2022/058906 filed on Apr. 4, 2022, and claims priority from European Patent Application No. 21465516.9 filed on Apr. 7, 2021, in the European Patent Office, the disclosures of which are herein incorporated by reference in their entireties.

BACKGROUND

1. Field

Particularly in the automotive industry, an increasingly important product is the Tire Pressure Monitoring Sensor (TPMS), also sometimes referred to as a wheel unit, which transmits via radio frequency signals the tire pressure information to a main receiver in a car or vehicle, which information can then be used to inform the user of tire conditions, or for further processing for other purposes. In addition to tire pressure, the TPMS or wheel unit may also transmit other useful information such as tire temperature or information on different stress conditions encountered in or by the tire.

The radio frequency spectrum used can be, in general, in the ISM bands (such as 315 MHz or 434 MHz) or, in more recent systems, higher frequencies such as Bluetooth Low-Energy (2.4-2.48 GHz). Even Ultra-Wide Band (UWB) could be used.

The ISM frequencies and Bluetooth Low Energy (BLE) operate at relatively long wavelengths compared to the size of the wheel unit, which is physically space-constrained and typically very small, in addition the wheel unit must integrate all electronics inside a housing, including: sensor, battery, microcontroller, corresponding circuits and RF antenna.

Therefore, the antenna of the TPMS or wheel unit must be small enough to fit inside the wheel unit, but ideally large enough approximate at least a quarter of the wavelength $\lambda/4$, in order to resonate and be efficient in transmission and/or reception. Electrically small loop antennas are also used in ISM bands due to small size, but these types of antennas may often suffer from a low radiation efficiency (below −15 dB or even below −20 dB). Also, the environment itself, comprised of metal rim plus tire (rubber and metallic structural elements) brings additional damping and further reduces the overall radiation efficiency of the antenna.

An electromagnetic analysis of the complete wheel system (metal rim plus tire) shows that other electromagnetic modes with good antenna transmission efficiency are available within the wheel structure and, with specifically designed antennas, may be specifically excited to benefit from the maximum radiation properties of the wheel structure and system itself.

Embodiments of the instant application include a small antenna size with electrically small monopoles or dipoles, smaller or even much smaller than a quarter of a wavelength, which do not resonate but are nevertheless capable of exciting the desired electromagnetic modes in the wheel structure. An embodiment uses an antenna of length $\lambda/10$ or less. Advantages may include the possibility to tune the transmitter on those frequencies showing the maximum obtainable antenna radiation efficiency; for example, within the Ultra-Wide Band (UWB) frequency range, there are several channels of 500 MHz width between 5 GHz and 9 GHz, which show increased system efficiency as detailed below. The same advantage may be applied to other wide-band frequency ranges.

Embodiments comprise a simple and small antenna placed inside a TPMS wheel unit, with which the above-mentioned advantages can be realized, and which yield results better than those with the larger antenna which has been used in existing TPMS systems. The inventive concept benefits from the observation that that the complete wheel structure including tire may be brought to act as a waveguide. This structure, depending on its overall dimensions (given by the wheel and tire type) will yield certain electromagnetic propagation modes, of which a selection are present in the working frequency range. From these modes, the most efficient ones are selected to excite the wheel with the inventive antenna design and orientation.

Embodiments include a wheel structure with a TPMS system including an antenna according to the inventive concept, where the wheel structure as assembled comprises an antenna which is non-resonant, and sized and oriented such that the complete wheel structure including tire will act as a waveguide.

Embodiments also include manufacturing a wheel structure with a TPMS system including an antenna according to the inventive concept. The wheel structure and the antenna efficiency may be simulated and the position and/or size of the antenna may be determined based on the simulation results of the antenna efficiency. The wheel structure can then be assembled with the position and/or size of the antenna as determined.

DETAILED DESCRIPTION

In embodiments of the instant application, the antenna is sized and positioned such that the complete wheel structure including tire will act similar to a waveguide. The inventive structure, depending on its overall dimensions, and/or on the wheel and tire type, benefits from certain electromagnetic propagation modes, of which a selection are present in the working frequency range. From these modes, the most efficient ones are selectively excited with the inventive antenna design and orientation. By running a characteristic mode analysis or eigenmode solver, it can be demonstrated that selected electromagnetic propagation modes are present in the working frequency range.

Figure 1:
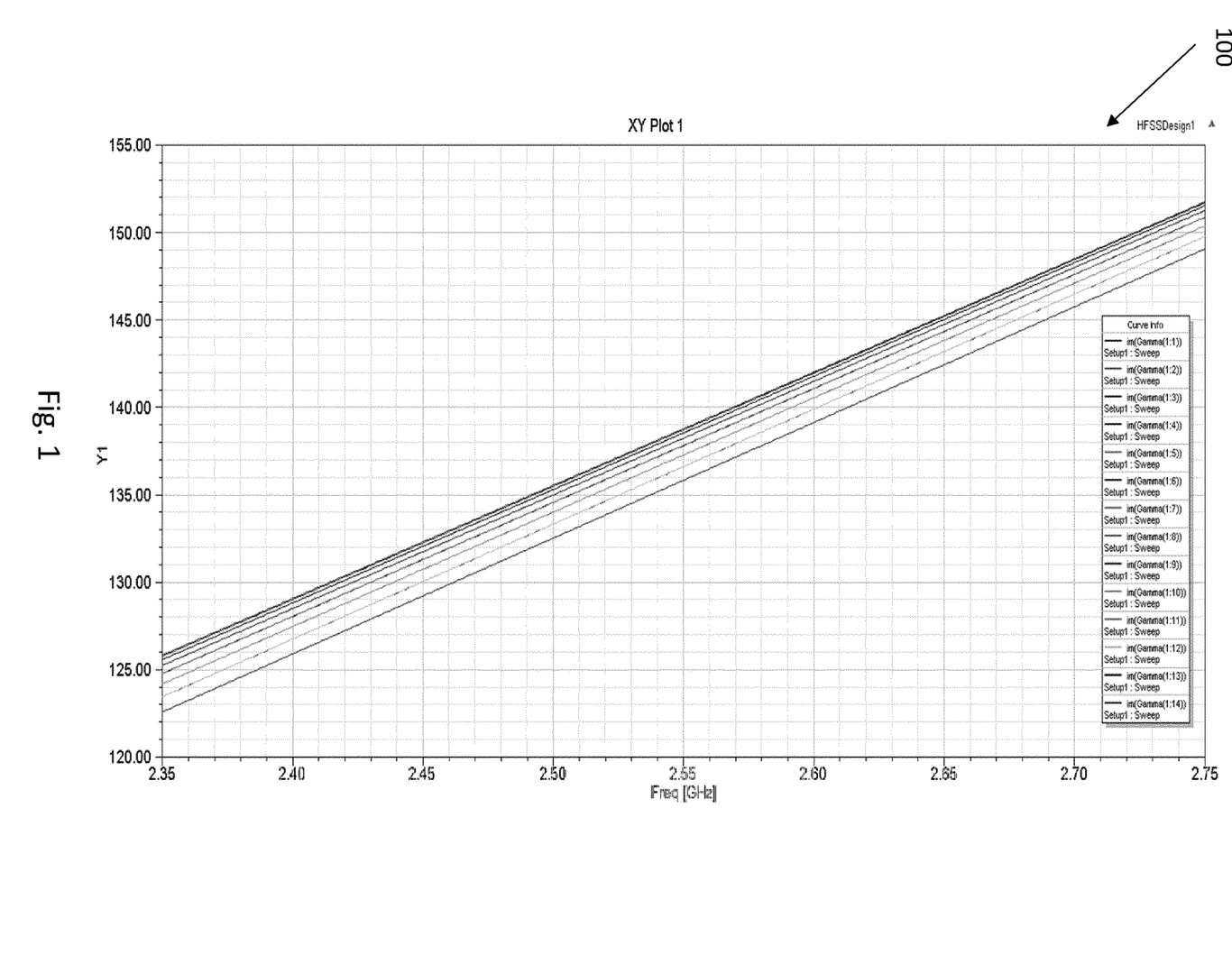
FIG. 1 shows Characteristic Modes of a generic wheel model.

The complete wheel is a relatively big structure, so its characteristic first modes may be excited already below 2.4 GHz. FIG. 1 shows an Eigenmode analysis in Ansys AEDT for a generic wheel model. A small monopole antenna can be excited by these superior Electromagnetic modes and can provide a good radiation efficiency. It can even be shown that the structure propagation modes are excited at frequencies far below 2.35 GHz, as seen in curves 100 of FIG. 1, for example, with an Eigenmode analysis.

This example embodiment shows that with a very simple and small antenna placed inside a TPMS wheel unit, the inventive idea can be realized and the results can actually be better that with a larger antenna which is standard for use in TPMS systems.

These analyses were made using Ansys AEDT electromagnetic simulations. For this purpose, specific electrical models have been implemented, containing models of the wheel, tire and TPMS wheel unit. The wheel and tire can be adjusted for different dimensions commonly used on the market. The wheel unit model is a simplified one, adapted for the analysis of the antenna performance and containing the housing, battery, PCB board and simplified metal valve assembly. This can be seen in FIG. 2, where wheel unit 200 comprises an antenna 210 perpendicular to the PCB.

Figure 2:
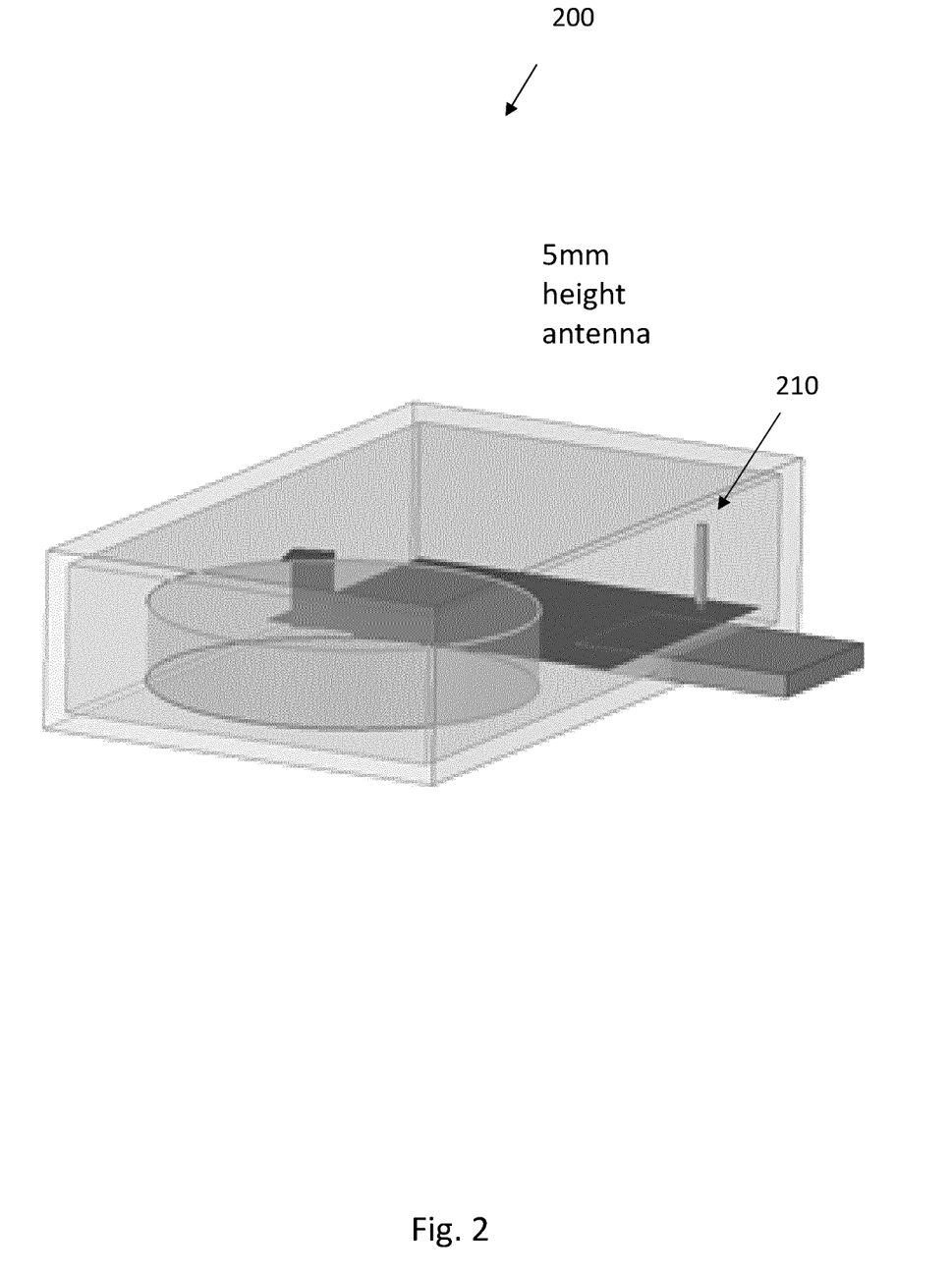
FIG. 2 shows an embodiment of the inventive concept.

The antenna 210 may be too short to resonate at the frequency used for transmission, and so it acts to excite the wheel structure. In embodiments, the antenna may have a length substantially shorter than a quarter wavelength. In embodiments, the antenna may have a length of $\lambda/0$ or less. In embodiments, the antenna may have a length of approximately 5 mm.

Figure 3:
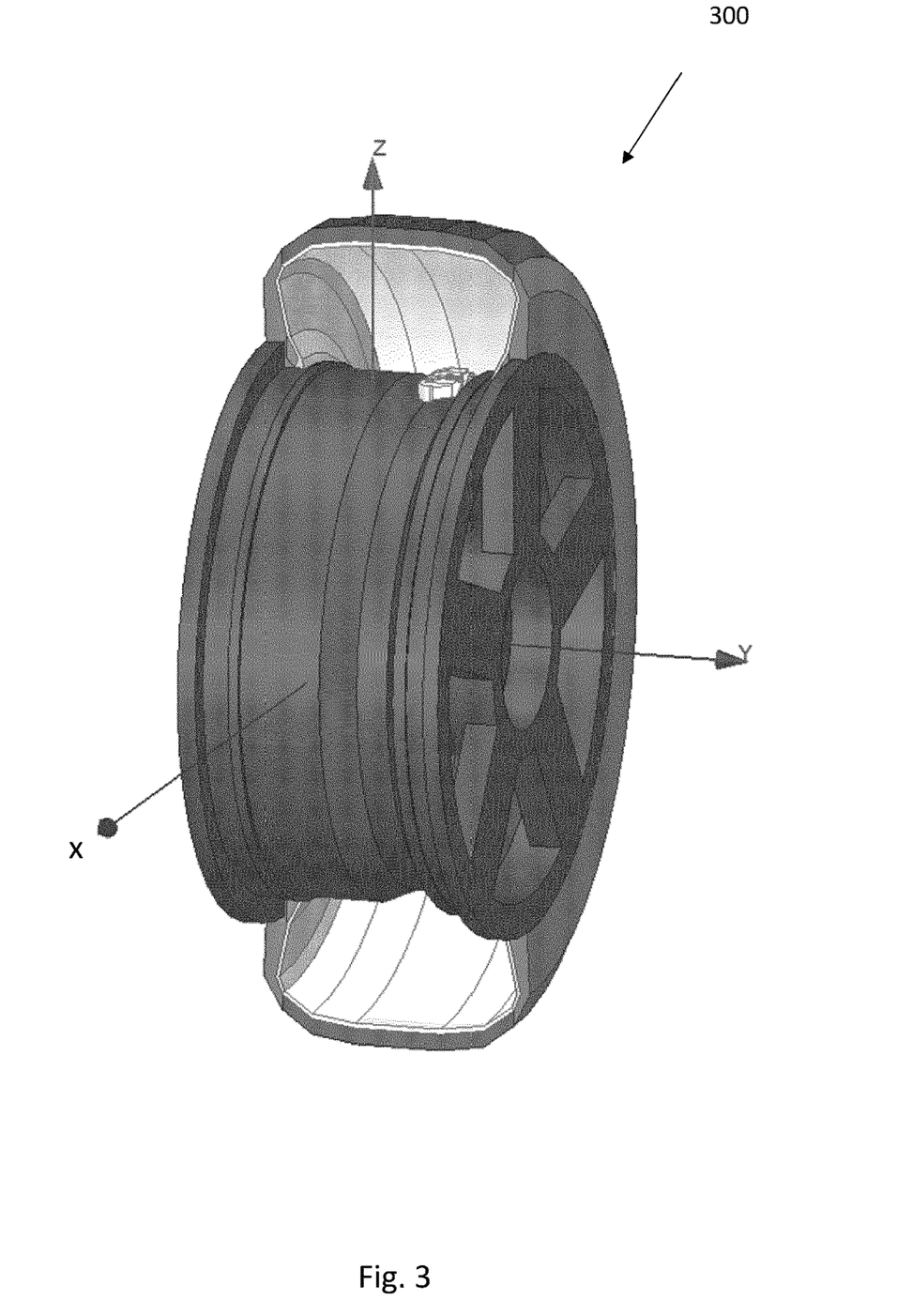
FIG. 3 shows a conceptual model of a cross-section of a complete wheel structure.

A cross-section of a complete wheel structure constructed in Ansys AEDT is represented as 300 in FIG. 3. The wheel structure can be simulated before being assembled. An advantageous embodiment and method for manufacturing a wheel structure with a TPMS system including an inventive antenna, may comprise simulating the wheel structure and the antenna efficiency.

The position and/or size of the antenna may be determined based on the simulation results of the antenna efficiency. The simulation results can then be applied to assemble the wheel unit and the wheel structure with the position and/or size of the antenna as determined by the simulation. In embodiments of the inventive method, the position and/or size of the antenna may be determined such that the efficiency is at least between −2 dB and −4 dB, or in whatever other efficiency range is required for the target application.

Using these above-mentioned models, a broadband analysis was performed between 1 GHz and 3 GHz. The overall radiation efficiency of the small antenna was investigated for 4 wheel (tire+rim) dimensions (195/65 R15; 205/55 R16; 235/40 R17 and 235/45 R18) and the results were plotted in FIG. 4.

Figure 4:
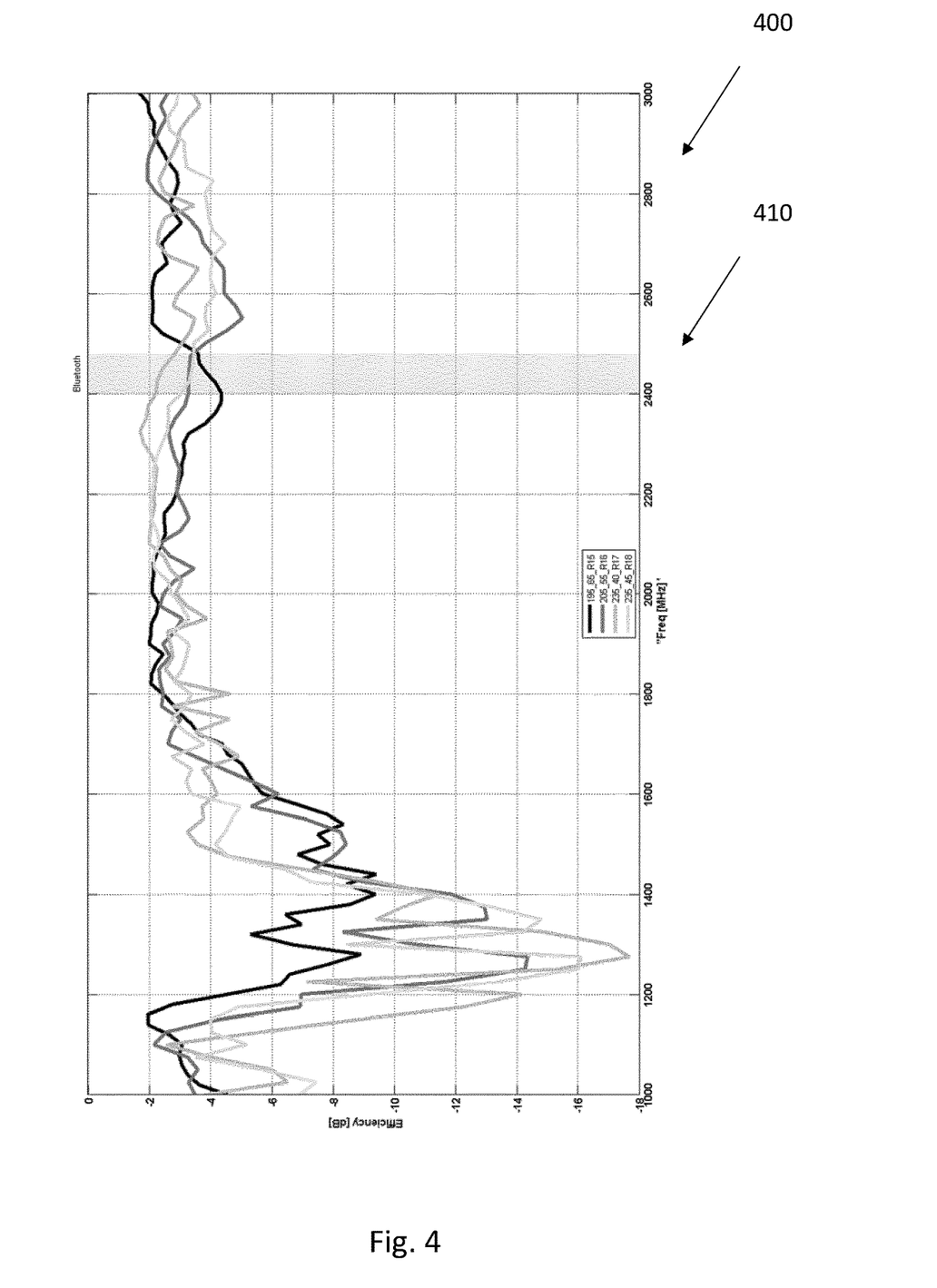
FIG. 4 shows a dependency of antenna efficiency on the frequency and on the wheel dimensions.

It can be seen that, depending on the frequency and also on the wheel dimensions, the antenna efficiency 400 varies substantially; in the BLE band at 410 it approaches a maximum value, as shown between −2 dB and −4 dB.

Figure 5:
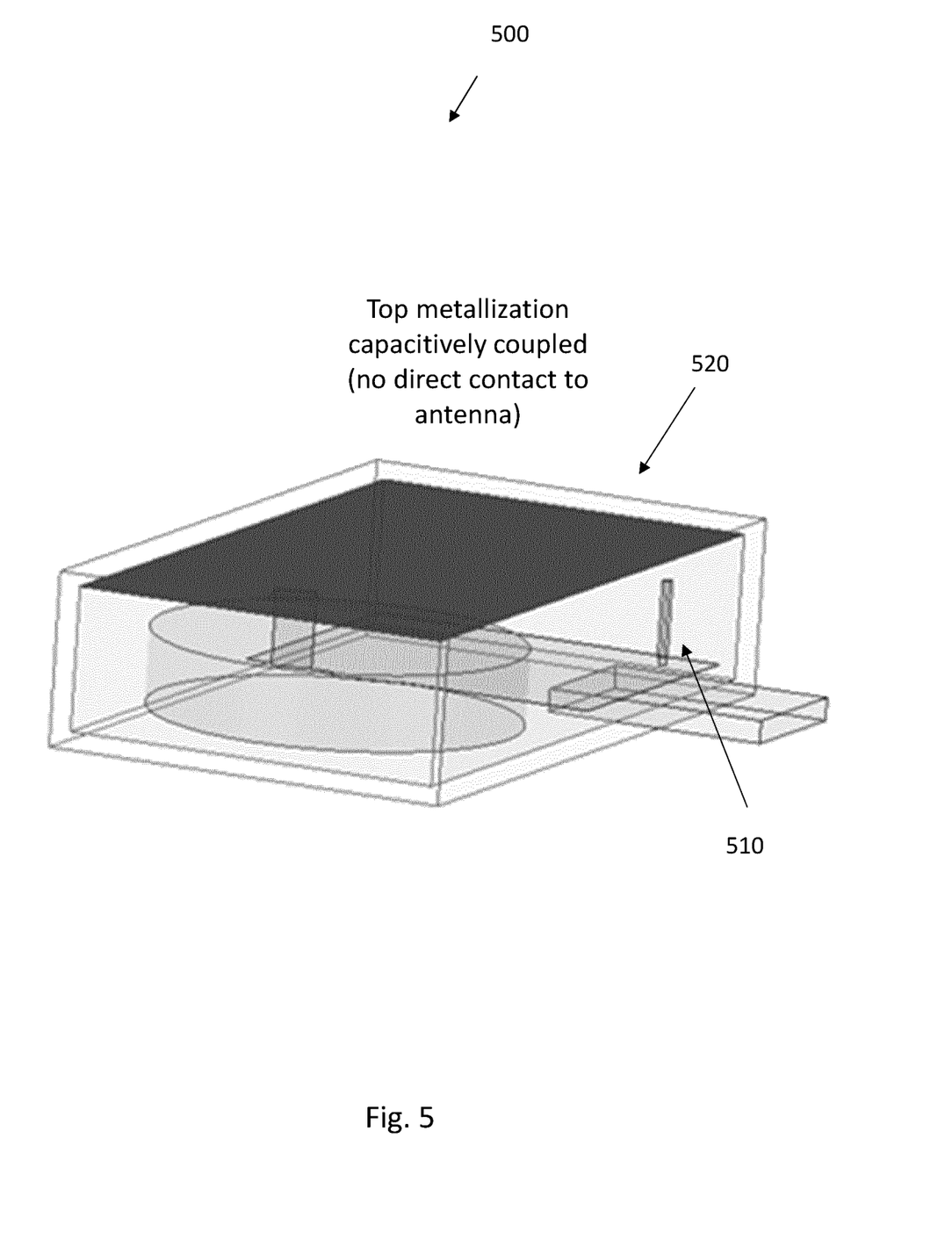
FIG. 5 shows an alternate embodiment of the inventive concept.

The next analysis was done with a similar model, but with an additional capacitively loaded top metallization of the housing inner wall above the antenna, as highlighted in FIG. 5. In this example, the metallization plane is perpendicular to the antenna. Element 520 is a metal plane capacitively coupled to the antenna 510 without a direct contact.

Figure 6:
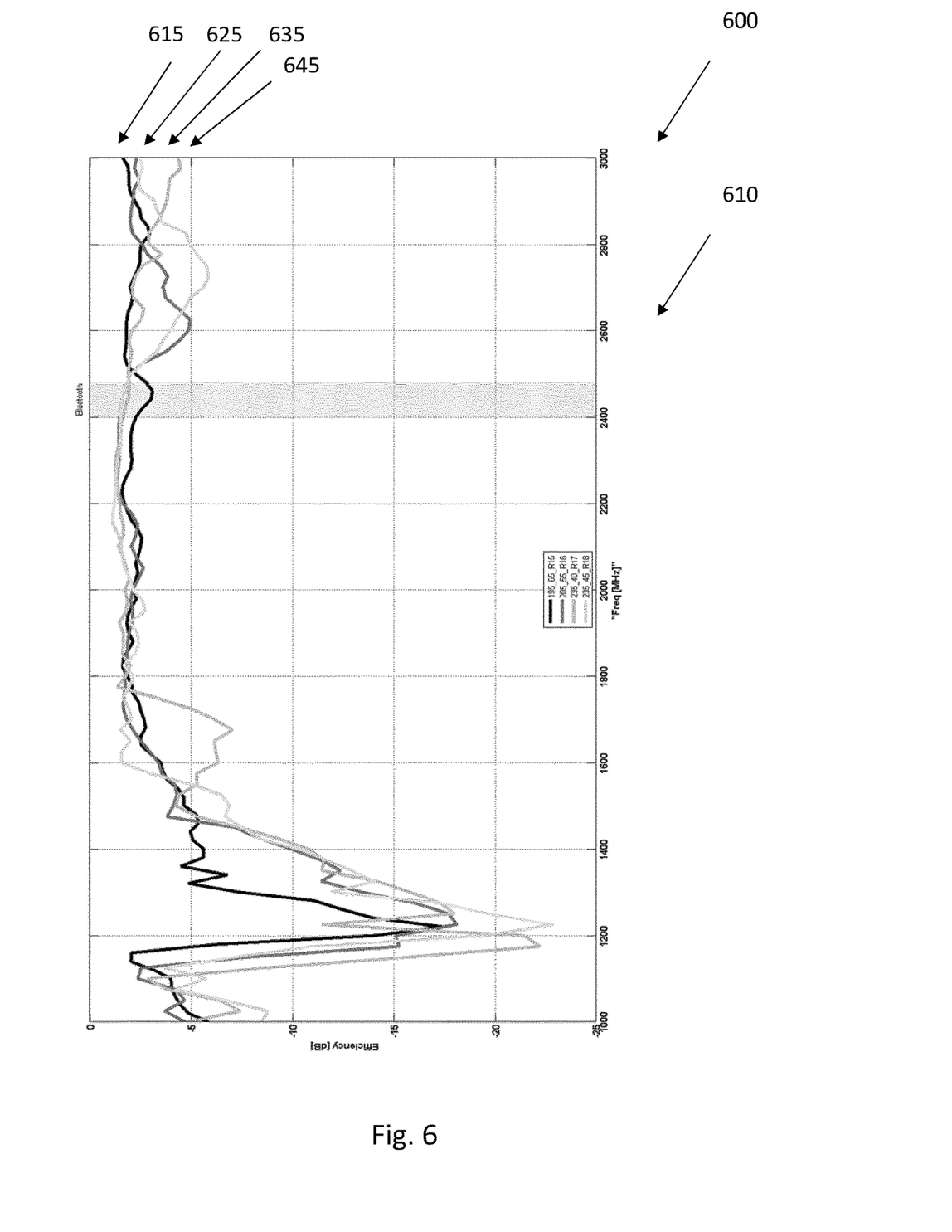
FIG. 6 shows the dependency of antenna efficiency on the frequency and on the wheel dimensions for a known quarter-wavelength antenna.

By implementing this capacitive loading, the antenna efficiency is increased even more, as shown in FIG. 6. The efficiency 600 rises to an almost maximum value in the BLE band (above −2 dB) shown as 610.

In FIG. 6 are shown efficiency traces for various Wheel/Tire configurations, always in the context of BLE communication. Trace 615 shows the efficiency over frequencies of a 195 65R15 wheel/tire combination. Trace 625 shows the efficiency over frequencies of a 205 55R16 wheel/tire combination. Trace 635 shows the efficiency over frequencies of a 235 40R17 wheel/tire combination. Trace 645 shows the efficiency over frequencies of a 235 45R18 wheel/tire combination.

Figure 7:
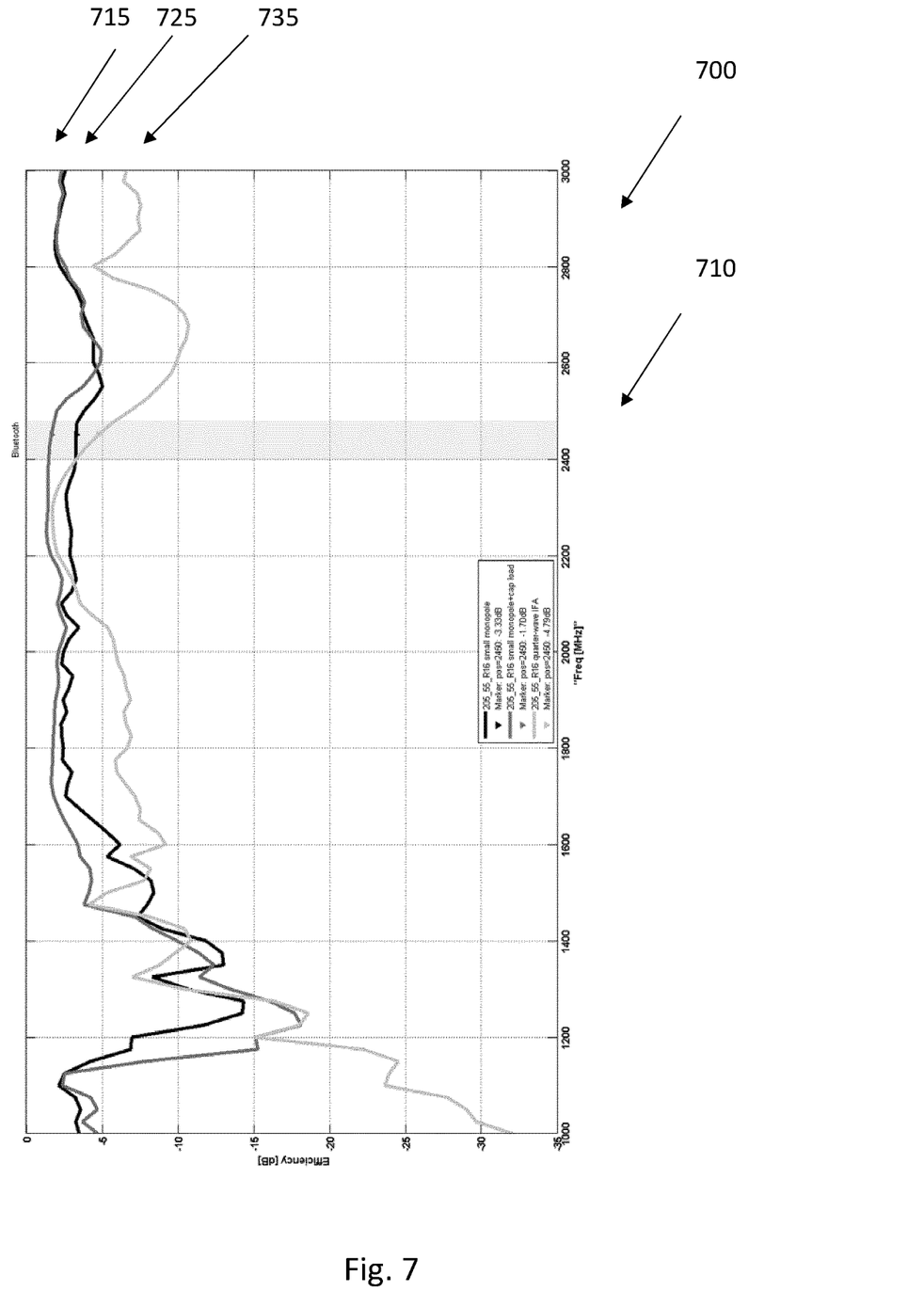
FIG. 7 shows the dependency of antenna efficiency on the frequency for an additional embodiment of the inventive concept.

In comparison, a normal quarter-wave antenna, as commonly used in such BLE designs, was inserted in a similar wheel unit model to identify differences and improvements from the inventive approach. The comparison was performed on a 205/55 R16 wheel assembly as shown in FIG. 7. Trace 715 shows a wheel/tire combination 205/55 R 16 with a small monopole antenna, 725 shows a 205/55 R 16 combination with a small monopole antenna and a capacitive load, and 735 shows a 205/55 R 16 combination with a quarter-wave Inverted-F (IFA) antenna.

It can easily be observed that the IFA antenna, even being much longer than the small proposed monopole, yields in general an inferior radiation efficiency, with a delta of about −3 dB in the middle of the BLE band, as compared to the top-loaded monopole. This means that the position of the antenna inside the wheel structure and the optimum excitation of the EM modes are more important than the length of the antenna.

The same advantages of the inventive solution can be observed on UWB frequencies. Depending on the frequency bands on which the maximum obtainable efficiency values can be found, the inventive system specifies certain frequency channels or bands instead of others where the efficiency is lower. In embodiments, this may be achieved with software applications and thus may not require hardware changes.

Figure 8:
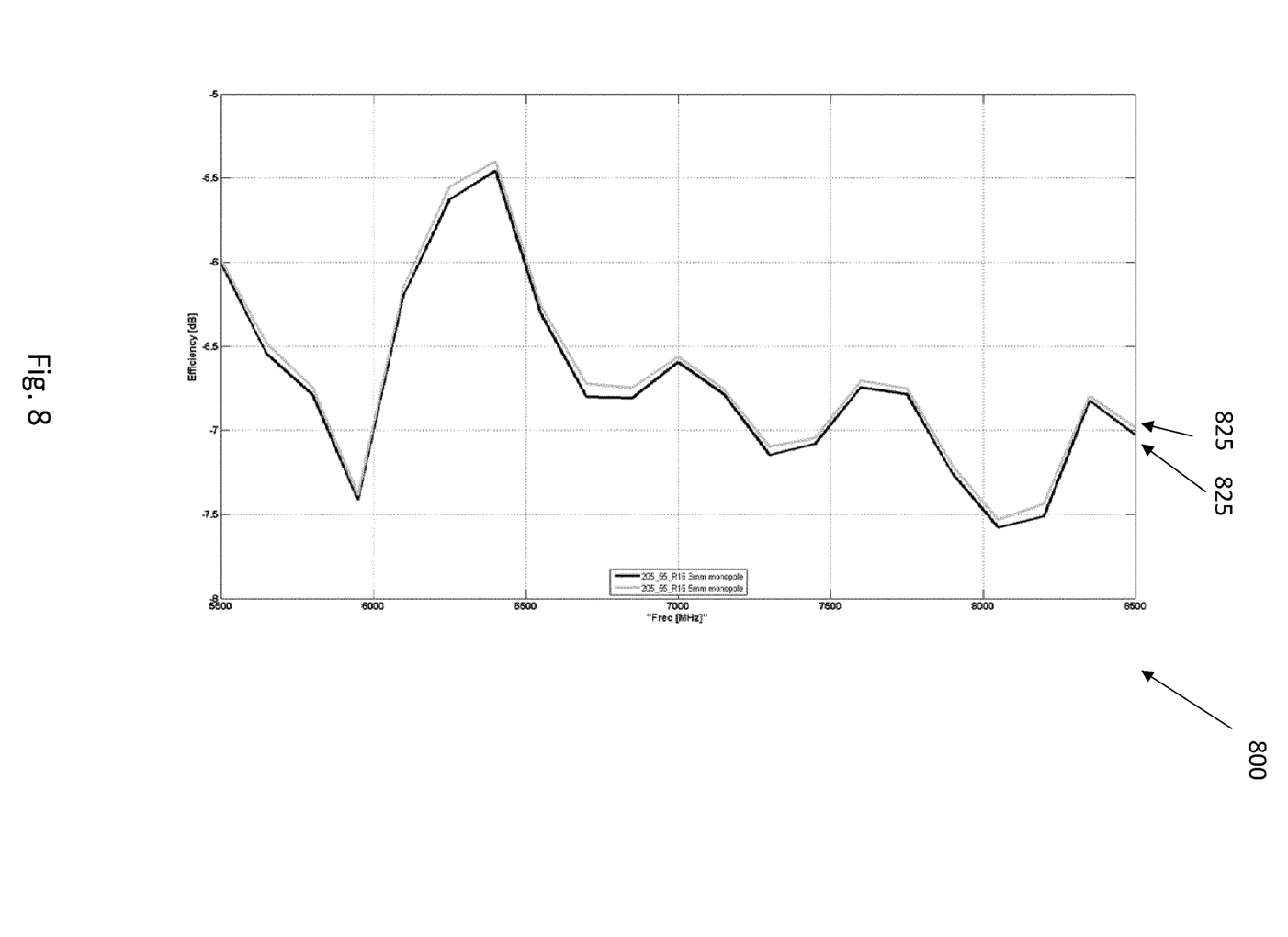
FIG. 8 shows a radiation efficiency of the antenna.

Using a reference monopole antenna, FIG. 8 shows a radiation efficiency of the antenna independent of its length—similar values are obtained for 3 mm and 5 mm height monopole antennas place on a 16-inch wheel. Trace 815 corresponds to a 3 mm monopole antenna, and trace 825 corresponds to a 5 mm monopole antenna. Thus the overall performance of the antenna in such an embodiment depends on the position on the wheel and the complete wheel structure, not on the antenna length.

In addition to communication using the standards Bluetooth and Bluetooth LE, the application can be used with other communications standards and frequencies which are compatible with the antenna described above.

The inventive concept is suited for a wheel structure with a TPMS system using the antenna concept described above. The wheel structure as assembled uses an antenna which is non-resonant. The antenna should be sized and oriented such that the complete wheel structure including tire will act as a waveguide.

The inventive concept can also be used to manufacture a wheel structure with a TPMS system including an antenna as described above. First, the wheel structure and the antenna efficiency is simulated, and the position and/or size of the antenna is determined based on the simulation results in order to improve the antenna efficiency. Then the wheel structure is assembled with the position and/or size of the antenna as determined. In embodiments, the wheel structure as assembled shows an antenna which is non-resonant, and sized and oriented such that the complete wheel structure including tire will act as a waveguide.

Thus, the instant application presents an improved solution as compared to existing resonant antenna structures used in Tire Pressure Monitoring Systems in vehicles. Embodiments using a very small non-resonant monopole antenna correctly placed inside a wheel unit above a ground plane defined by a printed circuit board (PCB), can offer very good system radiation efficiency values across a wide frequency range. This means that this application is not limited to a certain frequency bands, but can be adapted depending on the application.

The invention claimed is:

1. A wheel unit antenna comprising:
   a printed circuit board constituting a ground plane of the wheel unit antenna;
   a non-resonant antenna disposed above the ground plane defined by the printed circuit board; and
   a capacitively loaded top metallization plane disposed above the non-resonant antenna.

2. The wheel unit antenna of claim 1, wherein the non-resonant antenna has a length shorter than a quarter wavelength.

3. The wheel unit antenna of claim 2, wherein the non-resonant antenna has a length of $\lambda/10$ or less.

4. The wheel unit antenna of claim 1, wherein the non-resonant antenna has a length of approximately 5 cm.

5. The wheel unit antenna of claim 1, wherein the metallization plane above the antenna is perpendicular to an orientation of the non-resonant antenna.

* * * * *